US008000465B2

(12) United States Patent
Williams et al.

(10) Patent No.: US 8,000,465 B2
(45) Date of Patent: *Aug. 16, 2011

(54) SYSTEMS AND METHODS FOR ENDPOINT RECORDING USING GATEWAYS

(75) Inventors: Jamie Richard Williams, Alpharetta, GA (US); Thomas Z. Dong, Marietta, GA (US); Mark Edmund Coleman, East Setauket, NY (US); Nathan George, Cupertino, CA (US); Andy Davies, Eversley (GB)

(73) Assignee: Verint Americas, Inc., Roswell, GA (US)

(*) Notice: Subject to any disclaimer, the term of this patent is extended or adjusted under 35 U.S.C. 154(b) by 1127 days.

This patent is subject to a terminal disclaimer.

(21) Appl. No.: 11/529,947

(22) Filed: Sep. 29, 2006

(65) Prior Publication Data
US 2007/0230444 A1   Oct. 4, 2007

Related U.S. Application Data

(63) Continuation-in-part of application No. 11/394,410, filed on Mar. 31, 2006, and a continuation-in-part of application No. 11/395,350, filed on Mar. 31, 2006, and a continuation-in-part of application No. 11/395,759, filed on Mar. 31, 2006.

(60) Provisional application No. 60/837,816, filed on Aug. 15, 2006.

(51) Int. Cl.
*H04M 1/65* (2006.01)
*H04M 3/523* (2006.01)
*H04L 12/18* (2006.01)
*G06F 15/16* (2006.01)
*H04M 3/56* (2006.01)

(52) U.S. Cl. ............... 379/266.1; 370/260; 370/352; 370/353; 370/356; 379/67.1; 379/202.01; 379/265.07; 709/204

(58) Field of Classification Search ............ 379/67.1, 379/112.01, 265.06, 265.07, 266.1, 202.01–206.01; 709/204; 370/260, 352, 353, 356
See application file for complete search history.

(56) References Cited

U.S. PATENT DOCUMENTS
3,594,919 A   7/1971   De Bell et al.
(Continued)

FOREIGN PATENT DOCUMENTS
EP   0453128 A2   10/1991
(Continued)

OTHER PUBLICATIONS

"Customer Spotlight: Navistar International," Web pae, unverified print date of Apr. 1, 2002.

(Continued)

*Primary Examiner* — Harry S Hong
(74) *Attorney, Agent, or Firm* — McKeon, Meunier, Carlin & Curfman, LLC

(57) ABSTRACT

Embodiments of the present invention provide systems and methods for recording media communications an exemplary method is comprised of the following steps: receiving instructions at a gateway to record an incoming call; receiving the incoming call from a calling communication device; determining whether to record the incoming call based on the received instructions; routing the incoming call to a called communication device in a customer center; responsive to the determination to record the incoming call, duplicating the media communications via the gateway; transmitting the duplicated media communications associated with the incoming call via the gateway; and recording the duplicated media communications.

20 Claims, 14 Drawing Sheets

U.S. PATENT DOCUMENTS

| | | |
|---|---|---|
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,084,581 A | 7/2000 | Hunt |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIllwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,547 B1 | 4/2002 | Eftink |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIllwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,751,297 B2 | 6/2004 | Nelkenbaum |
| 6,757,361 B2 | 6/2004 | Blair et al. |
| 6,772,396 B1 | 8/2004 | Cronin et al. |
| 6,775,377 B2 | 8/2004 | McIllwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 7,613,290 B2 * | 11/2009 | Williams et al. .......... 379/265.07 |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0064149 A1 | 5/2002 | Elliott et al. |
| 2002/0065911 A1 | 5/2002 | Von Klopp et al. |
| 2002/0065912 A1 | 5/2002 | Catchpole et al. |
| 2002/0075880 A1 | 6/2002 | Dolinar et al. |
| 2002/0128925 A1 | 9/2002 | Angeles |
| 2002/0143925 A1 | 10/2002 | Pricer et al. |
| 2002/0165954 A1 | 11/2002 | Eshghi et al. |

| | | | |
|---|---|---|---|
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2003/0190032 | A1 | 10/2003 | Ravishankar |
| 2004/0034672 | A1 | 2/2004 | Inagaki |
| 2004/0083099 | A1 | 4/2004 | Scarano et al. |
| 2004/0100507 | A1 | 5/2004 | Hayner et al. |
| 2004/0165717 | A1 | 8/2004 | McIlwaine et al. |
| 2004/0247205 | A1 | 12/2004 | Nagaya et al. |
| 2005/0138560 | A1 | 6/2005 | Lee et al. |
| 2006/0133595 | A1 | 6/2006 | Ravishankar |
| 2006/0146805 | A1 | 7/2006 | Krewson |
| 2007/0230444 | A1 | 10/2007 | Williams et al. |
| 2007/0230478 | A1 | 10/2007 | Dong et al. |
| 2007/0263787 | A1 | 11/2007 | Dong et al. |
| 2008/0082669 | A1* | 4/2008 | Williams et al. ............... 709/227 |
| 2009/0016522 | A1* | 1/2009 | Torres et al. ............. 379/265.06 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| JP | 2002073287 A2 | 3/2002 |
| WO | WO 98/43380 | 11/1998 |
| WO | WO 00/16207 | 3/2000 |
| WO | WO02/17036 A2 | 2/2002 |

OTHER PUBLICATIONS

"DKSystems Integrates QM Perception with OnTrack for Training," Web page, unvereified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"Price WaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of AI in Education," *AMC Crossroads* vol. 1: 1-13 (Fall 1996) Web page; unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs,*" *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations, authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You on (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb.10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. Interactive *TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, SCI-TECH, Dec. 4, 1997.
Needle. *Will the Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Rohde. *Gates Touts Interactive TV*, InfoWorld, Oct. 14, 1999.
Ross. *Broadcasters Use TV Signals to Send Data*, PC World Oct. 1996.
Stewart. *Interactive Television at Home: Television Meets the Internet*, Aug. 1998.
Wilson. *U.S. West Revisits Interactive TV*, Interactive Week, Nov. 28, 1999.
Notification of Transmittal of the International Search Report and the Written Opinion of the International Searching Authority, dated Mar. 14, 2008.
Notification Concerning Transmittal of International Preliminary Report on Patentability and Written Opinion of the International Searching Authority, dated Apr. 9, 2009.

* cited by examiner

SYSTEMS AND METHODS FOR ENDPOINT RECORDING USING GATEWAYS

CROSS REFERENCE TO RELATED APPLICATION

This application is a continuation-in-part of copending U.S. utility application entitled, "Systems and Methods For Endpoint Recording Using Phones," having Ser. No. 11/394,410, filed Mar. 31, 2006, which is entirely incorporated herein by reference, a continuation-in-part of copending U.S. utility application entitled, "Systems and Methods For Endpoint Recording Using a Conference Bridge," having Ser. No. 11/395,350, filed Mar. 31, 2006, which is entirely incorporated herein by reference, and a continuation-in-part of copending U.S. utility application entitled, "Systems and Methods For Endpoint Recording Using a Media Application Server," having Ser. No. 11/395,759 filed Mar. 31, 2006, which is entirely incorporated herein by reference. This application also claims the benefit to U.S. Provisional Application entitled "Systems and Methods for Enterprise Recording Via Software Switch", filed on Aug. 15, 2006, Application No. 60/837,816, which is entirely incorporated by reference herein.

TECHNICAL FIELD

The present invention is generally related to recording media communications and, more particularly, is related to systems and methods for recording the media communications through a customer center.

BACKGROUND

A traditional passive tap recording technique includes recorders that are deployed along routes of communications. In this technique, each recorder operates similar to a "sniffer" by analyzing pass-by communication packets. The recorder records the packets corresponding to certain communication sessions based on its configuration. FIG. 1 shows a typical deployment of passive tap recorders in a contact center. In an IP telephony environment, recorders are typically deployed either at the voice gateway, which interfaces between Internet Protocol (IP) network and public switched telephone network (PSTN), or at switches in order to stay along the routes of the communications. This technique has the advantages of (1) minimum intrusion to a communication system, (2) cost effectiveness in deployment for companies with centralized office locations, and (3) easy scalability for compliance recording. However, for companies with many distributed branch offices, the above advantages start to diminish. This is especially true if the purpose of the recorders is for quality monitoring.

With the growing usage of Voice over Internet Protocol (VoIP) technology, many telephony-based businesses, such as customer centers, are adopting distributed telephony systems with local access to PSTN, which are still controlled by centralized soft switches. Many customer centers are using at-home agents with soft-phones on their personal computers (PCs). Hence, some of the communications in the distributed telephony system may not be "along the communication route" that is needed for passive tap recording. Secondly, network security has now become a concern. The deployment of encryption technology has made passive tap recording become even more problematic.

In addition, many customer centers deploy recorders for quality monitoring purposes, instead of compliance. In this regard, only a small percentage of the communications are recorded, monitored, and sampled. However, to assure the accuracy of the sampling, communications are randomly selected for recording across all branch offices. With passive tap recording, a large number of recorders are potentially required and each recorder may have low usage.

A typical IP-based customer center using the passive tapping "sniffing" recording method is shown in FIG. 1. Two branch offices are shown in the figure. To communicate with any agents at the customer center, a customer communication device, such as a time domain multiplexing (TDM) or an IP phone, first sends communication signals to a call-processing device of the customer center, such as a soft switch. The communication signals can be sent either directly to the call-processing device in case of IP to IP communications or via a media processing device, such as a voice gateway in case of TDM to 1P. The communication network can be a PSTN network or IP-based network. Once the communication signals have been received, the call-processing device then routes the communication signals to an agent phone.

After several rounds of communication signals exchange, media communications between the agent's phone and customer's phone can proceed via media processing device and distribution devices. The distribution devices are network routers and switches. In order to record the media communications using passive tapping, recorders are deployed at the media processing device or distribution devices using the network traffic monitoring or duplicating features, such as the Cisco's Switch Port Analyzer (SPAN) feature, on these devices. These tapping features are often available to the recorders that are directly connected to the media processing device or distribution devices, namely to recorders deployed at each branch office. Hence, a large customer center having multiple branches, such as a branch in New York, a branch in Los Angeles, and a branch in Chicago, may need multiple recorders in each branch to record the voice communications.

SUMMARY

Systems and methods for recording media communications are provided. An exemplary method is comprised of the following steps: receiving instructions at a gateway associated with recording an incoming call; receiving the incoming call from a calling communication device; determining whether to record the incoming call based on the received instructions; routing the incoming call to a called communication device in a customer center; responsive to the determination to record the incoming call, duplicating the media communications via the gateway; transmitting the duplicated media communications via the gateway; and recording the duplicated media communications.

Customer center includes, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Disclosed herein are systems and methods for recording communication signals. In particular, the recording of the communication signals can be achieved using a soft switch, a conference bridge, a soft phone, a media communication device, a media application server and/or a gateway. In some embodiments, this can be accomplished without having a recorder directly connected to a switch or voice gateway for passive tape recording.

Exemplary systems are first discussed with reference to the figures. Although these systems are described in detail, they are provided for purposes of illustration only and various modifications are feasible. After the exemplary systems are described, examples of flow diagrams and sequence diagrams of the systems are provided to explain the manner in which the communication signals can be recorded.

Figure 1:
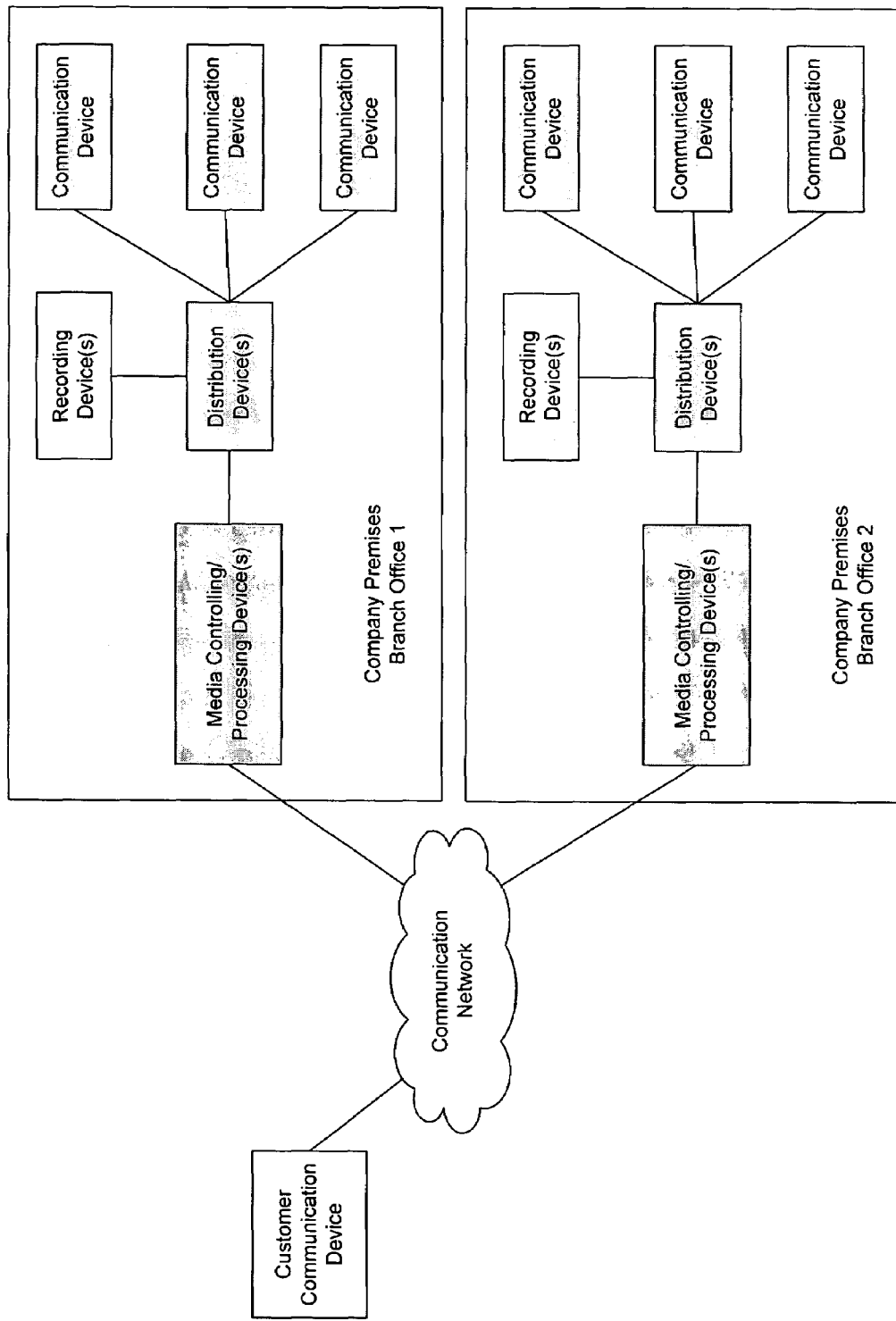
FIG. 1 is a schematic diagram of an embodiment of a system for passive tap recording.
Figure 2:
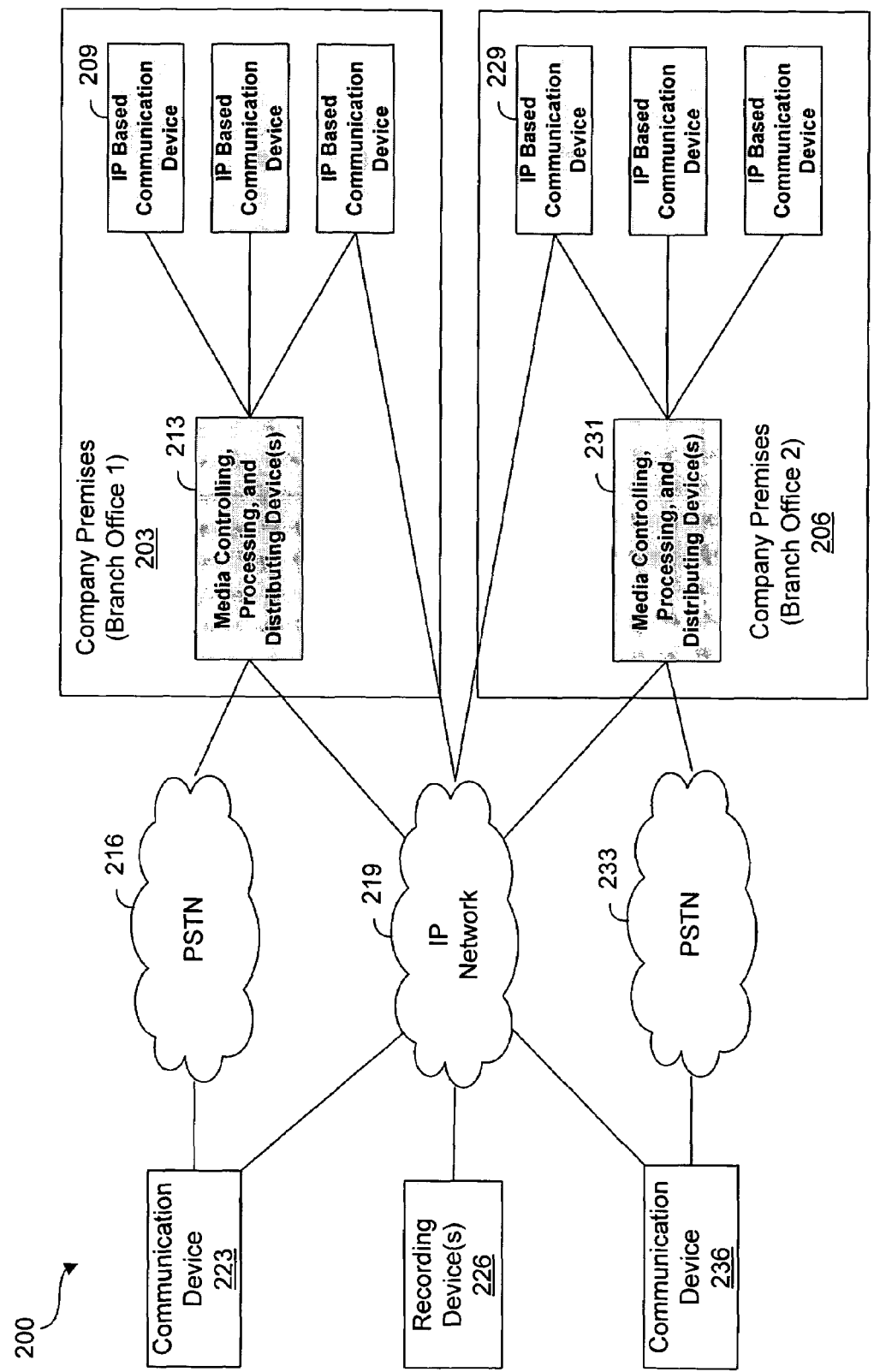
FIG. 2 is a schematic diagram of an embodiment of a system in which voice and media communications can be recorded by an endpoint recorder located anywhere in a customer center premises.

Referring now in more detail to the figures, FIG. 2 is a systematic diagram of an embodiment of a system in which voice and media communications can be recorded to an endpoint recorder. Two branch offices 203, 206 of a company may need to record communications with customers. Customer communication devices 223, 236 connect to branch offices 203, 206 either via an IP network 219 or via a PSTN network 216, 233, respectively. The customer communication devices 223, 236 can include, but are not limited to, telephones, soft-phones on hand held devices, or Personal Computers.

Recording device(s) 226 can be deployed anywhere on the IP network 219 connected to the branch offices 203, 206. Alternatively or additionally, the recording devices 226 can communicate with media controlling/processing/distributing devices 213, 231 in a secure fashion in encrypted environments, for getting communication events and for sending instructions. With the capability of the recording devices 226 to communicate with the media controlling/processing/distributing devices 213, 231, the recording device 226 can selectively record communications in the customer center using business rule policy. Alternatively or additionally, if a recording device is a cluster of recording devices, the recording device can communicate with the media controlling/processing/distributing devices 213, 231 to select which recording device from the cluster of recording devices to record the communications for load balancing purposes.

The media controlling/processing devices control the communication between customers and agents and between agents. The media controlling/processing devices can include, but are not limited to, voice gateways, soft switches, conference bridges, and multi-media application servers. The distributing devices can include, but are not limited to, routers and switches. Based on static configuration or instructions from the recording devices, the media controlling/processing devices can duplicate and transmit on-going communication between communication devices 209, 229, 223, 236 to the recording devices via the IP network 219 using its media processing features, such as conferencing. Alternatively or additionally, the media controlling/processing devices can also instruct the communication devices 209, 229 at the company premises 203, 231, respectively, to duplicate and transmit any on-going communications to the recording devices 226 using media processing features on the communication devices 209, 229. The operation of the system 200 is further described in relation to FIG. 9.

Figure 3:
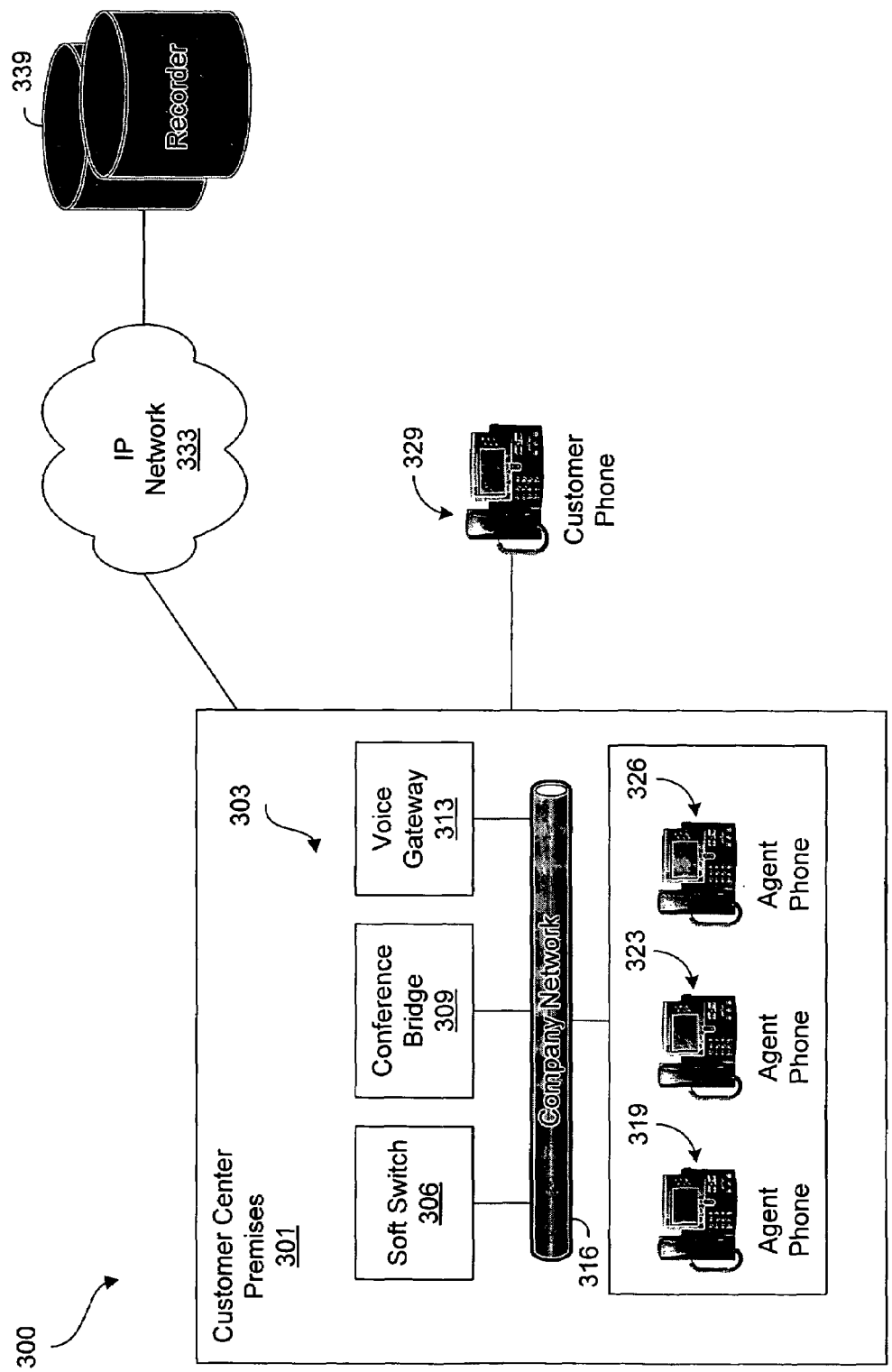
FIG. 3 is a schematic diagram of an embodiment of a system in which voice communication can be recorded by a voice endpoint recorder located anywhere in a customer center premises using a conference bridge.

FIG. 3 is a schematic diagram of an embodiment of a system in which voice communications can be recorded to a voice endpoint recorder using a conference bridge. As indicated in this figure, the system 300 is comprised of a customer center premises 301 that includes an IP telephony system 303 that enables communications between agent phones 319, 323, 326 and between agent phones and customer phone(s) 329. The IP telephony system 303 includes soft switch 306, conference bridge 309, voice gateway 313 and agent phones 319, 323, 326, all of which are connected to a company network 316. Calls from the customer phone 329 can be routed to a voice gateway 313, which can route the calls to the soft switch 306. The soft switch 306 receives incoming calls and routes the calls to the agent phones 319, 323, 326. The soft switch 306 communicates with the conference bridge 309 via the company network 316. The IP telephony system 303 communicates with a voice endpoint recorder 339 via an IP network 333. The company network 316 and IP network 333 can include, but are not limited to, a wide area network (WAN), a local area network (LAN), a virtual private network (VPN) and the Internet.

In this embodiment, the soft switch 306 is operative to send a command to the agent phones 319, 323, 326 and voice gateway 306 via the company network 316, instructing the agent phones 319, 323, 326 and voice gateway 306 to transmit voice communications associated with the incoming calls through the conference bridge 309 via the company network 316. The soft switch 306 also sends a command to the conference bridge 309 via the company network 316 to duplicate and transmit the voice communications to the voice endpoint recorder 339 using the IP network 333. The operation of the system 300 is further described in relation to FIGS. 9 and 10.

Alternatively or additionally, the soft switch 306 can receive instructions for recording the voice communications from the voice endpoint recorder 339 via the IP network 333. In turn, the soft switch 306 sends a command based on the received instructions to the conference bridge 309. Alternatively or additionally, the soft switch 306 can have capabilities of a conference bridge. That is, the soft switch 306 can duplicate and transmit the voice communications without using the conference bridge 309 to the voice endpoint recorder 339. The soft switch 306 with conferencing capabilities is added value to companies with a small number of agent phones.

Figure 4:
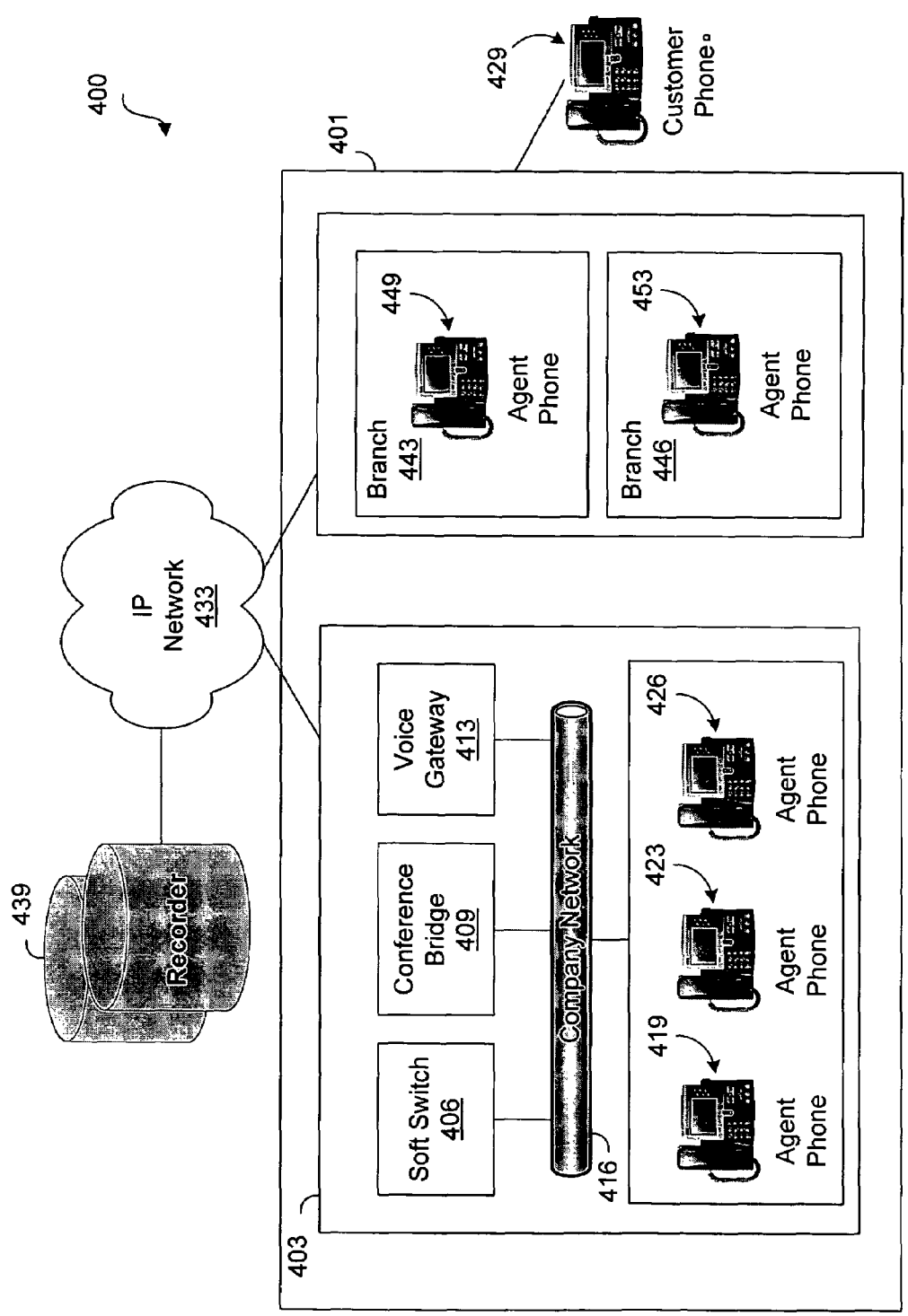
FIG. 4 is a schematic diagram of an embodiment of a system in which voice communication can be recorded by a voice endpoint recorder in a customer center premises having multiple branches using a conference bridge.

FIG. 4 is a schematic diagram of an embodiment of a system in which a voice communication can be recorded by a voice endpoint recorder in a customer center premises having multiple branches using a conference bridge. System 400 is similar to the system 300 in FIG. 3 described above. That is, the system 400 includes a customer center premises 401, customer phone 429, company network 416, voice gateway 413, IP network 433, soft switch 406, agent phones 419, 423, 426 and voice endpoint recorder 439.

As shown in FIG. 4, the customer center premises 401 further includes headquarters 403 that communicates with branches 443, 446 via the IP network 433. The headquarters 403 can be provided at one location, e.g., Chicago, and the branches 443, 446 can be provided at different locations, e.g., Los Angeles and Washington, D.C. Despite the different locations of the headquarters 403 and branches 443, 446, a voice communication can be recorded to a single voice endpoint recorder 439 using the conference bridge 409 and IP network 433. Note that the headquarters 403 includes a similar system as shown in FIG. 3. That is, the headquarters 403 includes soft switch 406, conference bridge 409, company network 416 and agent phones 419, 423, 426.

Agent phones 449, 453 within the branches 443, 446 can receive voice communications from within the customer center premises 403 or from customer phone 429. The soft switch 406 can send a command to the agent phones 449, 453, instructing the agent phones 449, 453 to transmit the voice communications through the conference bridge 409 via the IP network 433. The soft switch 406 also can send a command to the conference bridge 409 via the company network 416 to duplicate and transmit the voice communications to the voice endpoint recorder 439 using the IP network 433. The operation of the system 400 will also be described in greater detail in relation to FIGS. 9 and 10.

Figure 5:
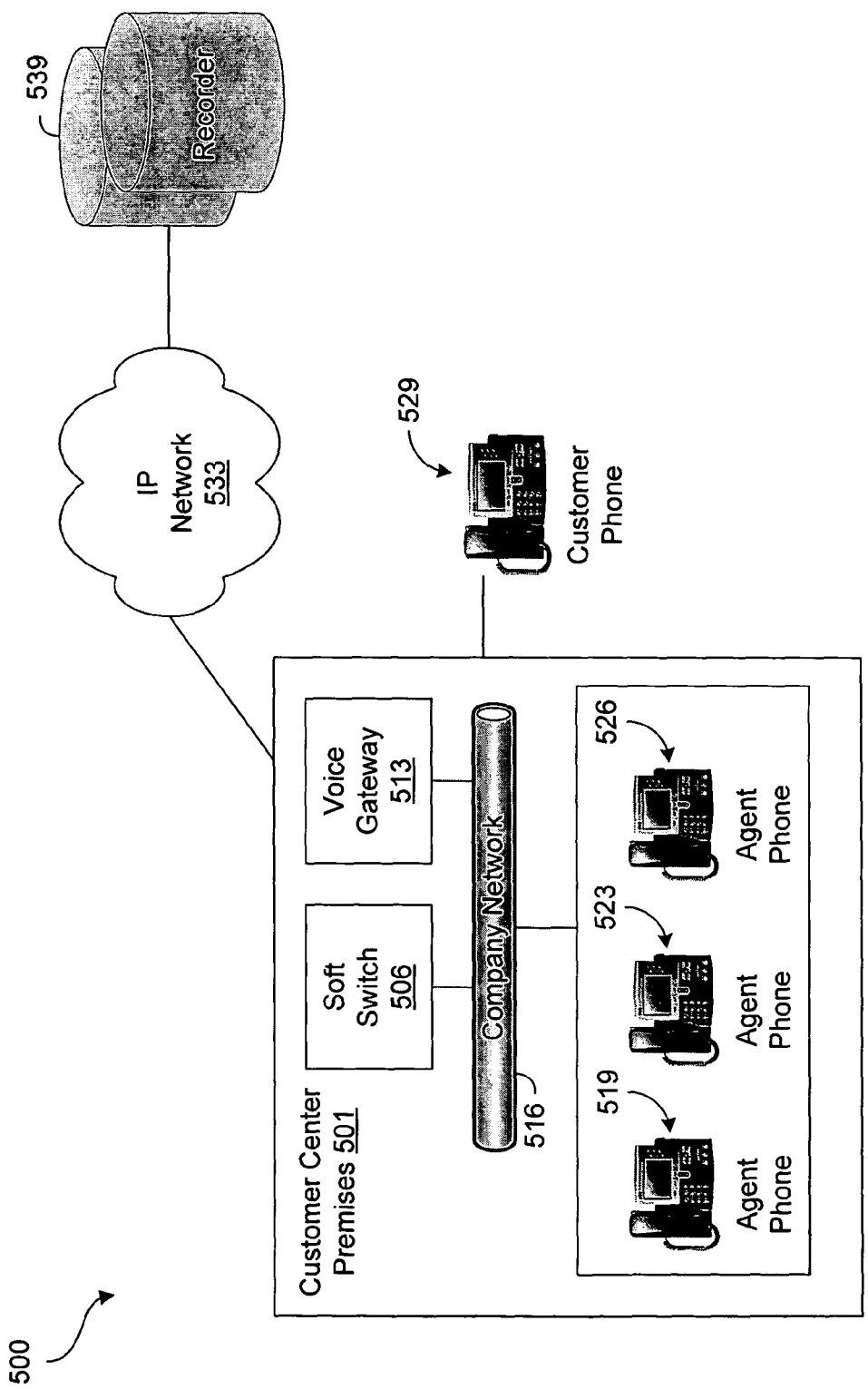
FIG. 5 is a schematic diagram of an embodiment of a system in which voice communication can be recorded by a voice endpoint recorder using a soft phone.

FIG. 5 is a schematic diagram of an embodiment of a system in which voice communication can be recorded by a voice endpoint recorder using a soft phone. The system 500 is similar to the system 300 in FIG. 3 described above. That is, the system 500 includes a customer center premises 501, customer phone 529, company network 516, IP network 533, voice gateway 513, and voice endpoint recorder 539.

As in FIG. 5, the soft switch 506 manages incoming calls and routes the incoming calls to agent phones 519, 523, 526 via the company network 516. The soft switch 506 communicates with the agent phones 519, 523, 526 to determine whether the phones can duplicate and transmit the voice communications associated with the calls to the voice endpoint recorder 539. If the agent phones have the capability, the soft switch 506 instructs the agent phones 519, 523, 526 via the company network 516 to duplicate and transmit the voice communications associated with the incoming calls to the voice endpoint recorder 539 using the IP network 533. Alternatively or additionally, the soft switch 506 can receive instructions for recording the voice communications from the voice endpoint recorder 539 via the IP network 533. In turn, the soft switch 506 sends a command based on the received instructions to the soft phones 519, 523, 526. The operation of the system 500 is further described in relation to FIGS. 9 and 11.

Figure 6:
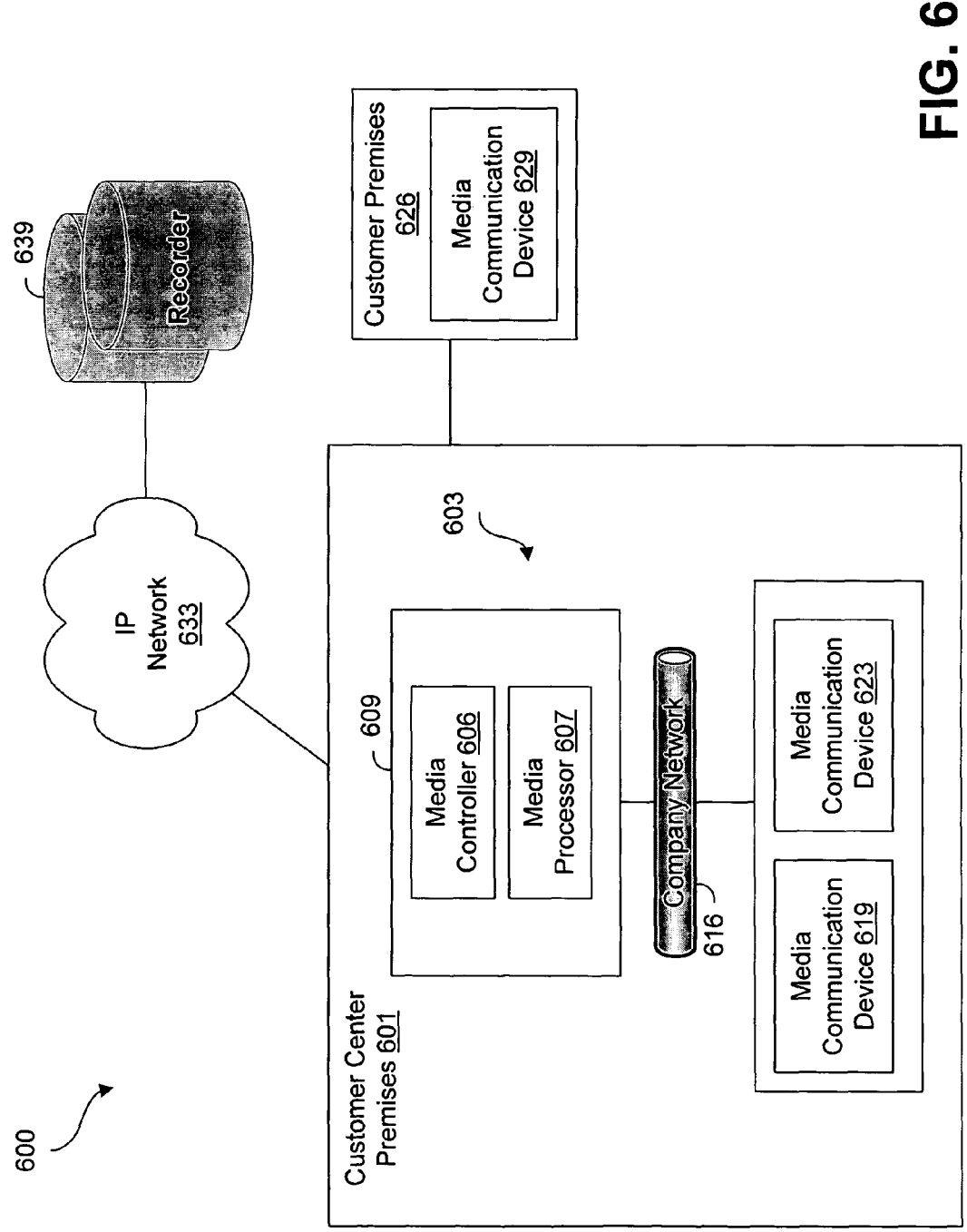
FIG. 6 is a schematic diagram of an embodiment of a system in which media communication can be recorded by a media endpoint recorder using a media application server.

FIG. 6 is a schematic diagram of an embodiment of a system in which media communication can be recorded by a media endpoint recorder using a media application server. The media communications can include, but are not limited to, audio, video, and text communications. The system 600 comprises a customer center premises 601 and a customer premises 626 that includes media communication devices 619, 623, 629, respectively. The media communications from the media communication device 629 can be routed to a media application server 609. The media application server 609 and the media communication devices 619, 623 communicate with each other via a company network 616. The media communication system 603 communicates with a media endpoint recorder 639 via an IP network 633.

In this embodiment, the media application server 609 includes a media controller 606 and a media processor 607. The media controller 606 receives incoming media communications, identifies the type of media communications, and routes the media communications to the media communication devices 619, 623 via the company network 616. The media controller 606 can send a command to the media communication devices 619, 623 via the company network 616, instructing the media communication devices 619, 623 to transmit the media communications through the media application server 609 via the company network 616. Once the media application server 609 receives the media communications, the media processor 607 duplicates and transmits the media communications to the media endpoint recorder 639 using the IP network 633. Alternatively or additionally, the media controller 606 can receive instructions for recording the media communications from the media endpoint recorder 639 via the IP network 633. In turn, the media controller 606 sends a command based on the received instructions to the media processor 607. The operation of the system 600 is further described in relation to FIGS. 9 and 12.

Alternatively or additionally, the media communication devices 619, 623 can have the capabilities of duplicating and transmitting the media communications to a media endpoint recorder 639. For example, the media controller 606 manages the media communications and routes the media communications to the media communication devices 619, 623 via the company network 616. The media controller 606 communicates with the media communication devices 619, 623 to determine whether the communication devices 619, 623 can duplicate and transmit the media communications to the media endpoint recorder 639. If the communication devices 619, 623 have the capability, the media controller 606 instructs the media communication devices 619, 623 via the company network 616 to duplicate and transmit media communications to the media endpoint recorder 639 using the IP network 633. Alternatively or additionally, the media controller 606 can receive instructions for recording the media communications from the media endpoint recorder 639 via the IP network 633. In turn, the media controller 606 sends a command based on the received instructions to the communication devices 619, 623.

Figure 7:
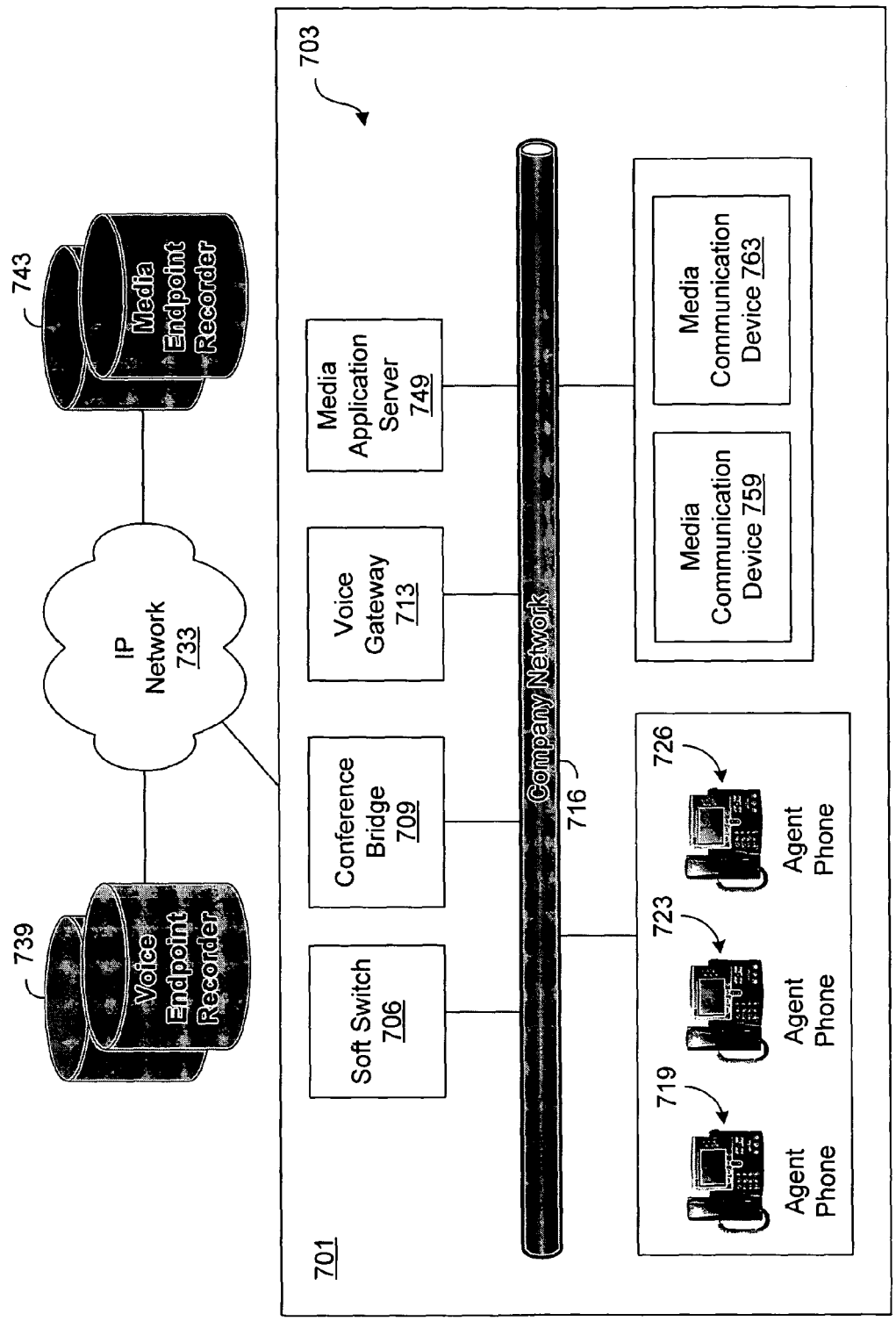
FIG. 7 is a schematic diagram of an embodiment of a system in which both voice communication and media communication can be recorded by a voice endpoint recorder and a media endpoint recorder in a customer center.

FIG. 7 is a schematic diagram of an embodiment of a system in which both voice communication and media communication can be recorded by a voice endpoint recorder and a media endpoint recorder in a customer center using a soft switch, conference bridge, agent phones, media communication devices, voice gateway, and media application server, respectively, via an IP network. The soft switch 706, conference bridge 709, agent phones 719, 723, 726, media communication devices 759, 763, voice gateway 713, and media application server 749 communicate with each other in an IP telephony system 703 via a company network 716.

In one scenario, for example, calls from a customer phone can be routed to the voice gateway 713, which can route the calls to the soft switch 706. The soft switch 706 receives incoming calls and routes the calls to the agent phones 719, 723, 726. The soft switch 706 communicates with the conference bridge 709 via the company network 716. The IP telephony system 703 communicates with a voice endpoint recorder 739 via an IP network 733. In this example, the soft switch 706 is operative to send a command to the agent phones 719, 723, 726 and voice gateway 706 via the company network 716, instructing the agent phones 719, 723, 726 and voice gateway 713 to transmit voice communications associated with the incoming calls through the conference bridge 709 via the company network 716. The soft switch 706 also sends a command to the conference bridge 709 via the company network 716 to duplicate and transmit the voice communication to the voice endpoint recorder 739 using the IP network 733. In another scenario, for example, the soft switch 706 can have capabilities of a conference bridge, as mentioned above. The soft switch 706 can duplicate and transmit the voice communications without the conference bridge 709 to the voice endpoint recorder 739 using the IP network 733.

In yet another scenario, for example, the soft switch 706 communicates with the agent phones 719, 723, 726 to determine whether the phones can duplicate and transmit the voice communications to an endpoint recorder 739. If the agent phones have the capability, the soft switch 706 instructs the agent phones 719, 723, 726 via the company network 716 to duplicate and transmit the voice communications associated with the incoming calls to the voice endpoint recorder 739 using the IP network 733.

In yet another scenario, for example, the media application server 749 receives incoming media communications, identifies the type of media communications, and routes the media communications to media communication devices 759, 763 via the company network 716. The media application server 749 can send a command to the media communication devices 759, 763 via the company network 716, instructing the media communication devices 759, 763 to transmit the media communications through the media application server 749 via the company network 716. The media application server 749 duplicates and transmits the media communications to the media endpoint recorder 743 using the IP network 733.

In yet another scenario, for example, the media communication devices 759, 763 can have the capabilities of duplicating and transmitting the media communications to a media endport recorder 743. For example, the media application server 749 manages the media communications and routes the media communications to the media communication devices 759, 763 via the company network 716. The media application server 749 communicates with the media communication devices 759, 763 to determine whether the communication devices 759, 763 can duplicate and transmit the media communications to the media endpoint recorder 743. If the communication devices 759, 763 have the capability, the media application server 749 instructs the media communication devices 759, 763 via the company network 716 to duplicate and transmit the media communications to the media endpoint recorder 743 using the IP network 733.

In yet another scenario, for example, the voice gateway 713 can perform the functions of duplicating and transmitting the voice communications to the voice endpoint recorder 739. For example, the voice gateway 713 receives instructions to record voice communications from the soft switch 706. It should be noted that the soft switch can receive the recording instructions from the media endpoint recorder 743. The voice gateway 713 receives, manages, and routes the voice communications to the agent phones 719, 723, 726 via the company network 716. The voice gateway 713 determines whether to record the received voice communications at the agent phones 719, 723, 726 according to the received instructions. If the voice gateway 713 determines that the voice communications are to be recorded, the voice gateway 713 duplicates and transmits the voice communications to the voice endpoint recorder 739 using the IP network 733.

In yet another scenario, for example, the voice gateway 713 is operative to be configured to duplicate the voice communications and transmit the duplicated voice communications to a second voice gateway (not shown). The second voice gateway transmits the duplicated voice communications to the desired endpoint component, such as the media endpoint recorder 743, another endpoint In yet another scenario, for example, the voice gateway 713 is operative to pass the voice communications to the second gateway. The second gateway is operative to be configured to duplicate the voice communications and transmit the duplicated voice communications to the desired endpoint component.

Alternatively or additionally, the voice endpoint recorder 739 is operative to be configured to duplicate and transmit voice communications. The voice endpoint recorder 739 is operative to duplicate and transmit the voice communications to the desired endpoint component using one of an endpoint component name, an IP address, a SIP address, and a domain name system (DNS) name of the desired endpoint component across the company and/or IP networks 716, 733. Some reasons, among others, to transfer recorded media communications from one recorder to another include load balancing the recorders, archive, and replay. The operation of an endpoint recording device is further described in relation to FIG. 13.

It should be noted that the systems 200, 300, 400, 500, 600, 700 can perform a service observation or a silent conference. Service observation is an extension-based monitoring functionality where an agent's communication is monitored when there is activity using a service observe access code entered along with the agent's IP address/port. The service observation enables supervisors to listen or view the media communication while the media communications take place. Silent conference is the ability to conference a monitored media communication into a conversation without "conference announcements" or indications.

Figure 8:
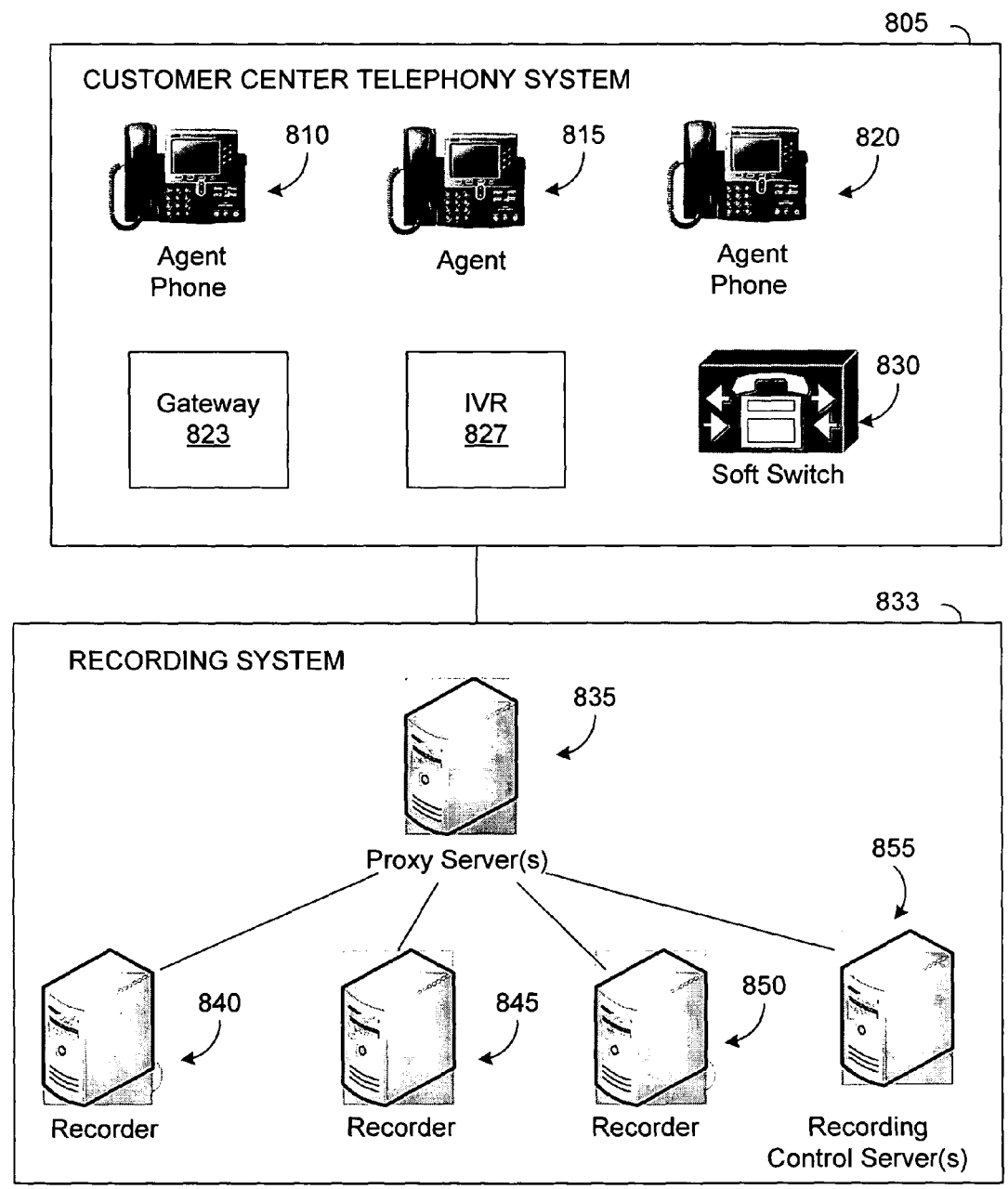
FIG. 8 is schematic diagram of an embodiment of a system in which media streams can be recorded via a gateway.

FIG. 8 is schematic diagram of an embodiment of a system in which media streams can be recorded via a gateway. A customer center telephony system 805 has one or more agent phones 810, 815, 820 that are coupled to one or more gateways 823, one or more interactive voice response (IVR) systems 827, and one or more soft switches 830. The customer center telephony system 805 is coupled to the recording system 833, which includes one or more proxy servers 835, one or more recorders 840, 845, 850, and one or more recording control servers 855.

It should be noted that the proxy server 835 is shown in FIG. 8 as a separate device from the other components of the recording system 833. However, the proxy server 835 can also be deployed on one of the recorders 840, 845, 850 or on other servers, such as the recording control server(s) 855. The proxy server 835 can communicate with the soft switch 830 to receive call events and other call related information such as agent identifications. The communication can also involve the recording of at least one media stream associated with an interaction within the customer center telephony system 805.

In general, incoming calls arrive at the gateway 823, which serves the incoming and outgoing traffic. The soft switch 830 instructs the gateway 823 to route the incoming calls based on customer center policy. Many incoming calls are routed to the IVR 827 before transitioning the call to an available agent in one of potentially many customer centers. It should be noted that the gateway 823, proxy server 835, PBX communication (not shown) and other switching device or network devices (not shown) can also route the incoming calls according to the customer center policy.

The soft switch 830 is operative to monitor incoming calls and invoke duplicate media streaming from the gateways. For example, the soft switch 830 can monitor a route point and identify an agent who potentially will receive the call or a dialed number identification service (DNIS) that had been dialed, among others. The recording system 833 receives an event corresponding to the incoming call and determines if the media streams associated with the incoming call should be recorded based on defined business rules. If the media streams are to be recorded, the recording system 833 issues a command to the soft switch 830, such as a computer-telephone integration (CTI) server. In turn, the soft switch 830 instructs the gateway 823 to duplicate the media streams associated with the incoming call and deliver the duplicated media streams to a specific recorder.

Once instructed to record the incoming call, the gateway 823 delivers the media streams to the recorder by issuing a session initiation protocol (SIP) invite to the recorder, which in turn responds with an "OK." Alternatively or additionally, the proxy server 835 may be used to distribute the incoming call to a plurality of recorders configured, for example, as a high availability system. The gateway 823 continues to transmit the media streams associated with the incoming calls to the recorder regardless of how the call is routed within the switch or between call centres. In turn, the recorder continues to receive event streams about the incoming calls as the calls transition within the customer center and potentially are transferred between customer centers.

If the media streams are to be recorded while in an TVR platform, the soft switch 830 can be used to instruct the gateway 823 to duplicate the media streams, which provides cradle to grave recording from the point of first contact with the customer and also enables the validation of the IVR handling.

Alternatively or additionally, the gateway 823 can receive instructions from a call manager (not shown) to duplicate the media stream from an agent handset. Alternatively or additionally, the gateway 823 can receive instructions from a call manager JTAPI interface or other CTI event interfaces (not shown) such that this mechanism might be used in topologies where phone DMS (duplicate media streaming) is not practical or where the customer has made a large purchase in handsets which do not support DMS.

Alternatively or additionally, the soft switch 830 can facilitate recording media streams associated with the incoming calls without the recording system constantly monitoring the event stream of the soft switch 830. The soft switch 830 can be configured to record or not record on an extension based on some pre-existing configuration. For example, as soon as the soft switch 830 detects an incoming call for a particular extension, the soft switch 830 can route the duplicate media streams to the appropriately configured recorder of the recording system 833. The gateway 823 receives instructions from the soft switch 830 and transmits SIP (Session Initiation Protocol) messaging for the duplicated media stream associated with the incoming call to the recorder. The SIP messaging is verbose enough such that the origin and reason for the call being recorded can be tagged without the soft switch events. The SIP messaging, includes, for example, the extension number and agent identification of the agent receiving the incoming call.

Alternatively or additionally, internal calls within the customer center can be recorded in certain scenarios. For example, incoming calls can be routed through a back-to-back gateway configuration such that the gateways can be instructed via the soft switch 830 to duplicate media streams associated with the incoming calls.

Figure 9:
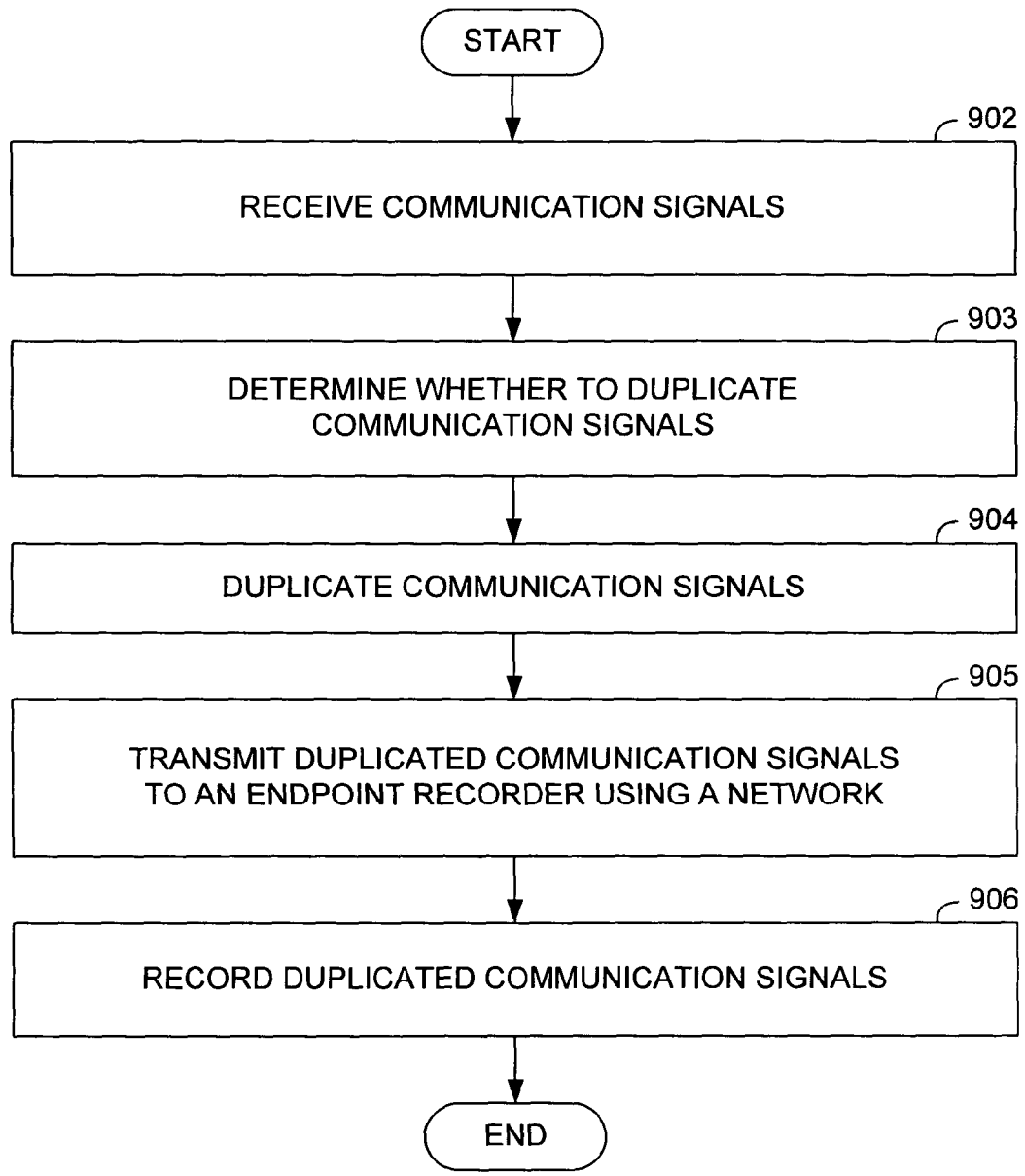
FIG. 9 is a flow diagram that illustrates a high-level example of operation of a system such as shown in FIG. 2.

FIG. 9 is a flow diagram that illustrates a high-level example of operation of a system such as shown in FIG. 2. Beginning with block 902, communication signals are received in a customer center. In block 903, the customer center determines whether to duplicate the communication signals such as by using the media controlling/processing/distributing devices 213, 231, as shown in FIG. 2. Alternatively or additionally, a recording device can provide instructions to the media controlling/processing/distributing devices 213, 231 for recording the communication signals. In block 904, the customer center duplicates the communication signals such as by using the media controlling/processing/distributing devices 213, 231 or communication devices 209, 229. In block 905, the duplicated communication signals are transmitted to an endpoint recorder using a network.

Figure 10:
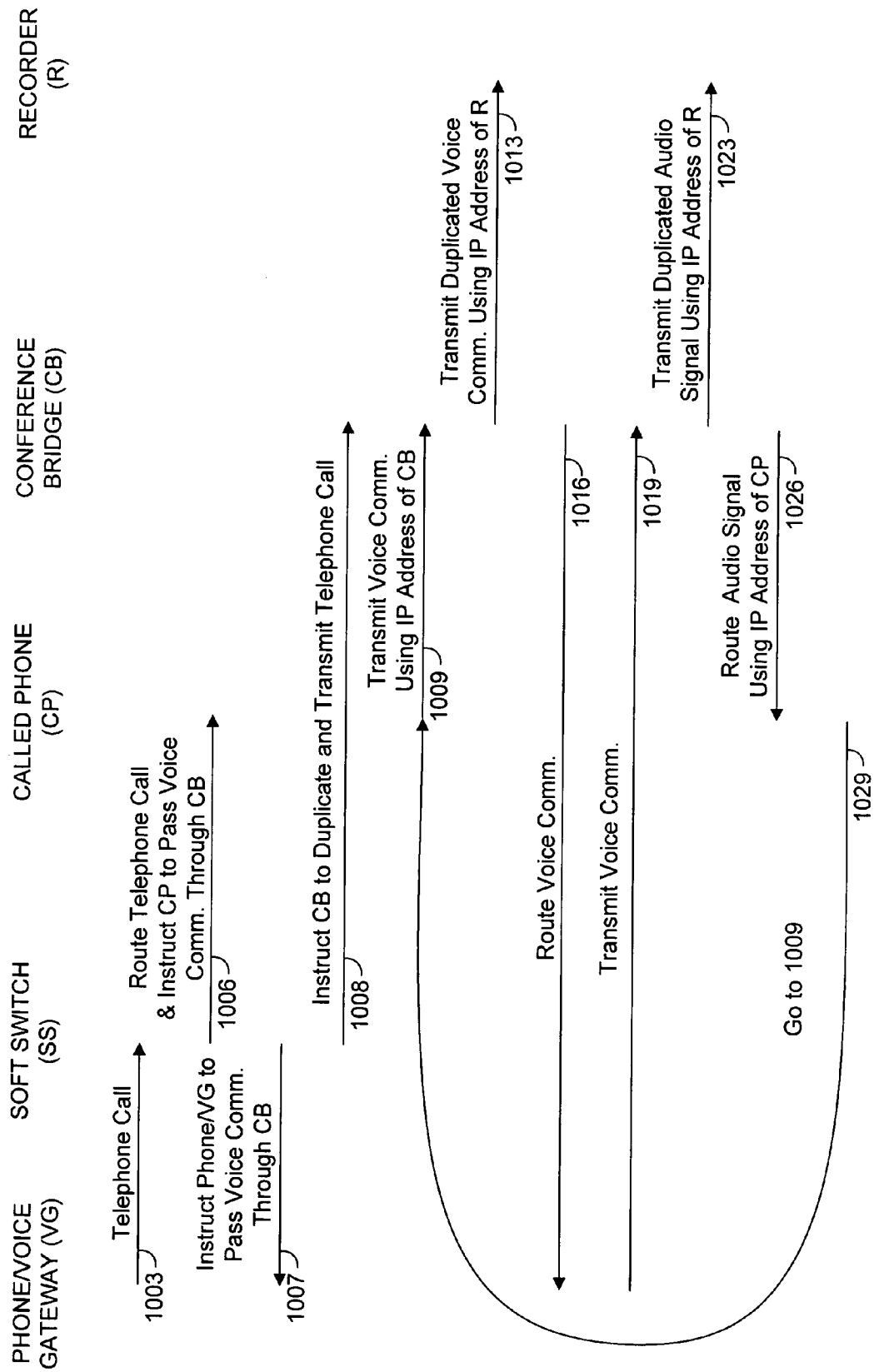
FIG. 10 is a sequence diagram of an embodiment of a system such as shown in FIGS. 3 and 4, in which a voice communication can be recorded using a conference bridge.

FIG. 10 is a sequence diagram of an embodiment of a system such as shown in FIGS. 3 and 4, in which a voice communication can be recorded using a conference bridge. Beginning with event 1003, a telephone call can be made from a customer phone or an agent soft phone. If the telephone call is made from the customer phone, the telephone call is passed through a voice gateway, which routes the telephone call to a soft switch of a customer center premises. If the telephone call is made from a first soft phone, for example, within the customer center premises, the soft switch of the customer center premises receives the telephone call. In both situations, the soft switch routes the telephone call to a second soft phone within the customer center premises and instructs the second soft phone to transmit the voice communication associated with the telephone call through a conference bridge, as shown at event 1006. At event 1007, the soft switch can instruct both the first soft phone and the voice gateway to transmit the voice communication through the conference bridge. The instruction to the soft phone and the voice gateway can include an Internet Protocol (IP) addresses/port of the conference bridge.

At event 1008, the soft switch instructs the conference bridge to duplicate and transmit the voice communication to a voice endpoint recorder. The instruction to the conference bridge can include an IP address/port of the voice endpoint recorder. At event 1009, the second soft phone transmits the voice communication to the conference bridge such as by using the IP address/port of the conference bridge. At event 1013, the conference bridge duplicates the voice communication from the second soft phone and transmits the duplicated voice communication such as by using the IP address/port of the voice endpoint recorder. Notably, the voice endpoint recorder can be located virtually anywhere in the customer center premises as long as the recorder is connected to a network.

At event 1016, the conference bridge routes the voice communication from the second soft phone to the first soft phone or the voice gateway. At event 1019, the first soft phone or the voice gateway transmits the voice communication to the conference bridge such as by using the IP address/port of the conference bridge. At event 1023, the conference bridge duplicates the voice communication from the first soft phone or the voice gateway and transmits the duplicated voice communication to the recorder such as by using the IP address/port of the recorder. At event 1026, the conference bridge routes the voice communication from the first soft phone or the voice gateway to the second soft phone of the customer center premises. Thereafter, the sequence is returned to event 1009 so that the second soft phone can transmit the voice communication to the conference bridge as instructed by the soft switch, as shown at event 1029.

Figure 11:
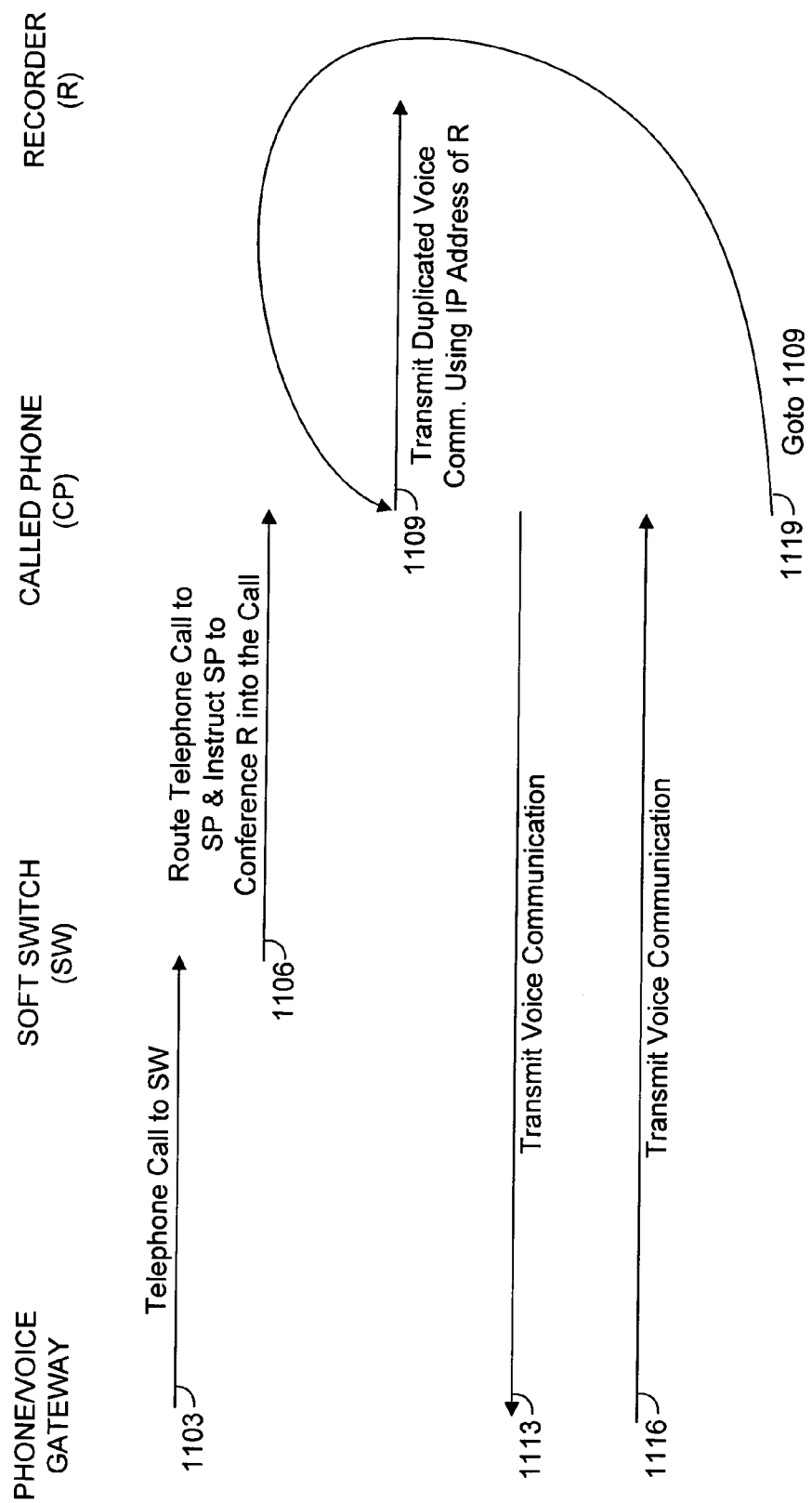
FIG. 11 is a sequence diagram of an embodiment of a system, such as shown in FIG. 5, in which a voice communication can be recorded using a soft phone.

FIG. 11 is a sequence diagram of an embodiment of a system, such as shown in FIG. 5, in which a voice communication can be recorded using a soft phone. Beginning with event 1103, a telephone call is transmitted from a first soft phone or a customer phone to a soft switch. At event 1104, the soft switch communicates with a second soft phone of a customer center premises to determine whether the second soft phone has conferencing capabilities. If the telephone call is made from the first soft phone of the customer center premises, the soft switch communicates with the first soft phone of the customer center premises to determine whether the first soft phone has conferencing capabilities. In this embodiment, the first and second soft phones are assumed to have conferencing capabilities. At event 1106, the soft switch routes the voice communication associated with the telephone call to the second soft phone, and instructs the second soft phone to duplicate and transmit the duplicated voice communication to a voice endpoint recorder. The instruction to the second agent phones includes, but is not limited to, an IP address/port of the voice endpoint recorder.

At event 1109, the second soft phone receives the voice communication from the first soft phone or the voice gateway, duplicates the voice communication and transmits the duplicated voice communication to the recorder such as by using the IP address/port of the recorder. At event 1113, the second soft phone transmits the voice communication to the first soft phone or the voice gateway. At event 1116, the first soft phone or the voice gateway transmits its voice communication to the second soft phone using the IP address of the second soft phone. At event 1119, the sequence is returned to event 1109 during which the second soft phone receives the voice communication from the first soft phone or the voice gateway, duplicates the voice communication and transmits the duplicated voice communication to the recorder.

Figure 12:
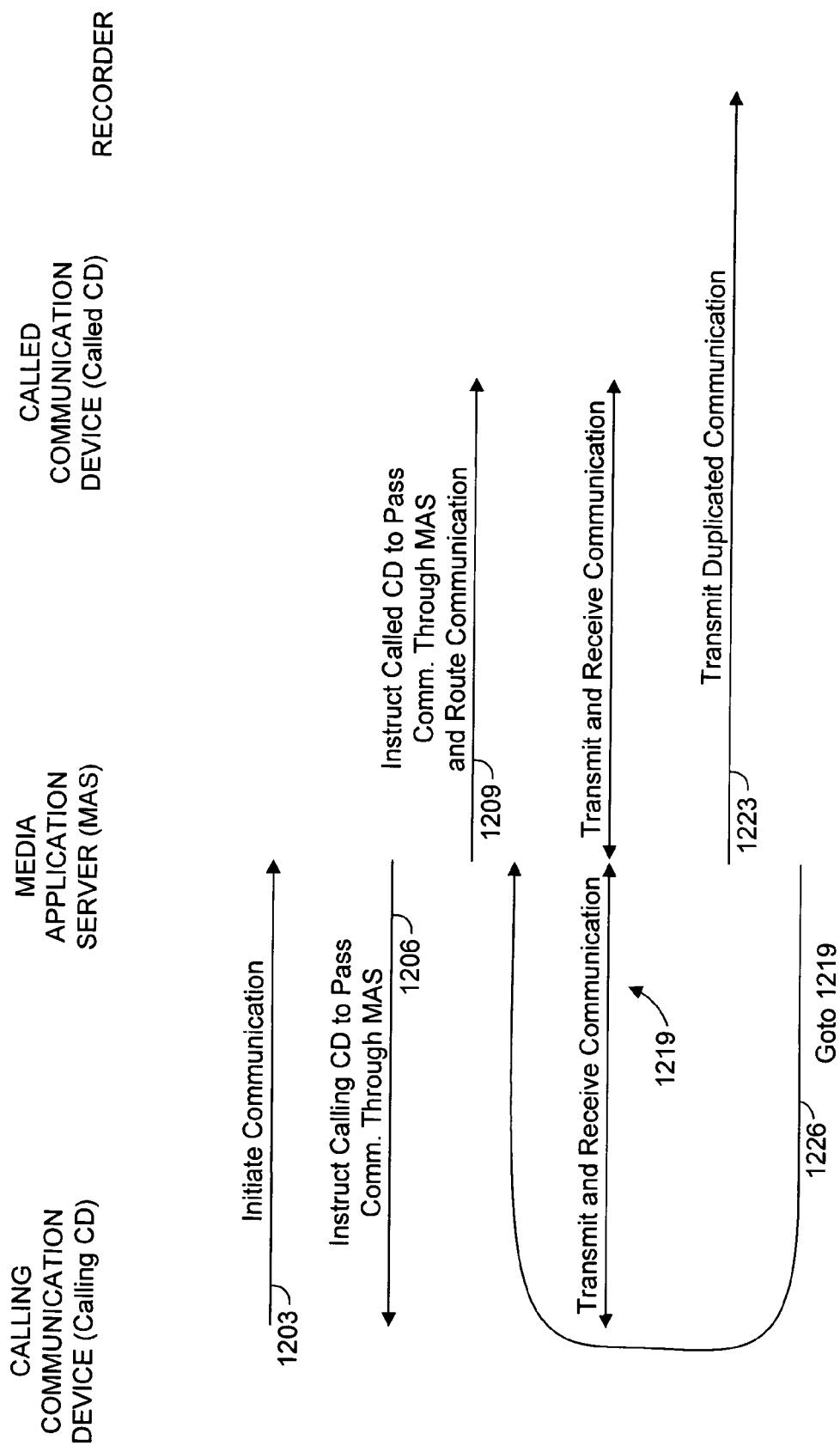
FIG. 12 is a sequence diagram of an embodiment of a system, such as shown in FIG. 6, in which a media communication can be recorded via a media application server.

FIG. 12 is a sequence diagram of an embodiment of a system, such as shown in FIG. 6, in which a media communication can be recorded via a media application server. Beginning with event 1203, media communications can be initiated from a customer communication device or a first agent communication device. At event 1206, the media application server receives the media communications and instructs the first agent communication device to transmit the media communications through the media application server. At event 1209, the media application server routes the media communications to a second agent communication device of the customer center premises and instructs the second agent communication device to transmit the media communications through the media application server. The instructions to the communication devices can include an IP address/port of the media application server.

At event 1219, the communication devices transmit the media communications to the media application server such as by using the IP address/port of the media application server. In turn, the media application server receives and transmits the media communications to the communication devices. At event 1223, the media application server duplicates the media communication from the communication devices and transmits the duplicated media communications such as by using an IP address/port of a media endpoint recorder. At event 1226, the sequence is returned to event 1219 during which the media application server duplicates the media communications between the calling and called communication devices and transmits the duplicated media communications to the recorder.

Figure 13:
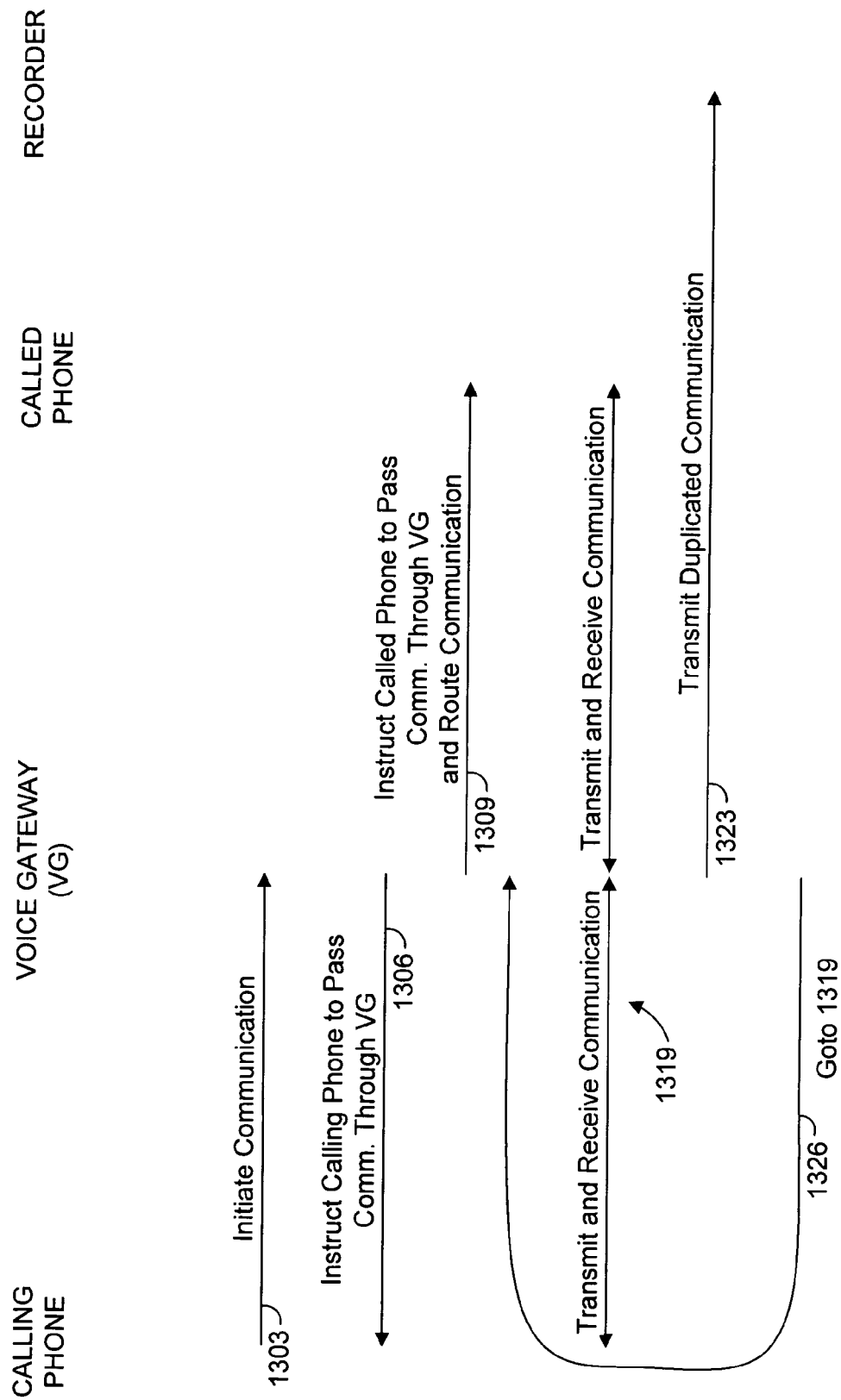
FIG. 13 is a sequence diagram of an embodiment of a system, such as shown in FIG. 7, in which a media communication can be recorded via a gateway.

FIG. 13 is a sequence diagram of an embodiment of a system, such as shown in FIG. 6, in which a voice communication can be recorded via a voice gateway. Subsequently, in this embodiment, a soft switch can transmit instructions to the gateway to facilitate the recording of the voice communications of an interaction. Beginning with event 1303, voice communications can be initiated from a calling phone by a customer or an agent. At event 1306, the voice gateway receives the voice communications and instructs the calling phone to transmit the voice communications through the voice gateway.

At event 1309, the gateway routes the voice communications to a phone of the customer center premises and instructs the phone to transmit the voice communications through the gateway. The instructions to the phone can include an IP address/port of the gateway. The gateway further determines whether to record the voice communications of the call based on the received instructions from, for example, the soft switch.

At event 1319, the phones transmit and receive the voice communications to the gateway such as by using the IP address/port of the gateway. At event 1323, if the gateway determines that the voice communications are to be recorded, the gateway duplicates the voice communications from the phones and transmits the duplicated voice communications such as by using the IP address/port of the voice endpoint recorder. At event 1326, the sequence is returned to event 1319 during which the gateway duplicates the voice communications between the calling and called phones and transmits the duplicated voice communications to the recorder.

Figure 14:
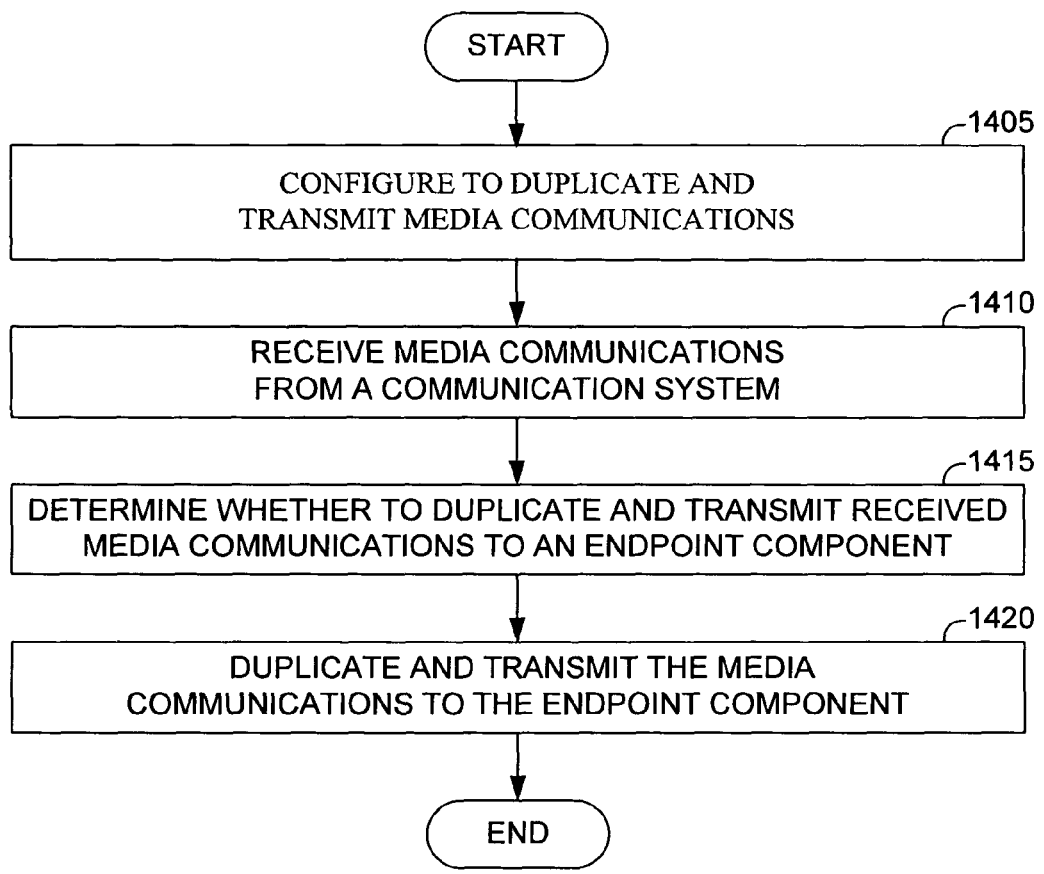
FIG. 14 is a flow diagram that illustrates operation of an embodiment of an endpoint recording device.

FIG. 14 is a flow diagram that illustrates operation of an embodiment of an endpoint recording device. In block 1405, the endpoint recording device is configured to duplicate and transmit media communications associated with an incoming call. For example, the endpoint recording device can receive instructions from a soft switch that configures the endpoint recording device to duplicate and transmit the media communications. In block 1410, the endpoint recording device receives the media communications from a communication system, such as an IP telephony system. In block 1415, the endpoint recording device determines whether to duplicate and transmit the media communications to a desired endpoint component based on the received instructions. In block 1420, responsive to the determination, the endpoint recording device duplicates the media communications and transmits the duplicated media communications to a desired endpoint component across the communication system.

It should be emphasized that the above-described embodiments are merely possible examples of implementations, merely set forth for a clear understanding of the principles of the invention. Many variations and modifications may be made to the above-described embodiments without departing substantially from the spirit and principles of the invention. All such modifications and variations are intended to be included herein within the scope of this disclosure and the present invention and protected by the following claims.

Therefore, having thus described the invention, at least the following is claimed:

1. A method for recording a communication session, comprising the steps of:
    receiving an incoming call at a switch from a calling communication device;
    determining whether to record the incoming call based on received instructions;
    routing the incoming call by a gateway to a called communication device in a customer center;
    responsive to the determining that the incoming call is to be recorded, duplicating media communications associated with the incoming call via the gateway;
    transmitting the duplicated media communications via the gateway to a recording device; and
    recording the duplicated media communications at the recording device.

2. The method as defined in claim 1, further comprising transmitting instructions to the gateway to route incoming calls based on customer center policy.

3. The method as defined in claim 2, wherein the instructions are transmitted from one of a soft switch and a recording device.

4. The method as defined in claim 1, further comprising monitoring incoming calls and invoking duplicate media streaming from the gateway based on the monitored calls.

5. The method as defined in claim 1, further comprising receiving an event stream corresponding to the incoming call and determining whether to record the media communications associated with the incoming call based on business rules of the customer center.

6. The method as defined in claim 1, wherein the step of transmitting the duplicated media communications to the recording device is performed by delivering the media communications to the recording device by issuing a session initiation protocol (SIP) invite to the recording device.

7. The method as defined in claim 1, wherein the step of transmitting the duplicated media communications to the recording device is performed by using a proxy server to distribute the duplicated media communications to the recording device.

8. The method as defined in claim 1, further comprising:
    duplicating the media communications from the calling communication device via the gateway; and
        transmitting the duplicated media communications from the calling communication device to the recording device using one of a recording device name, an IP address, a SIP address, and a domain name system (DNS) name of the recording device.

9. A system for recording a communication session, comprising:
    a gateway operative to receive an incoming call and route the incoming call across a network;
    a first communication device operative to receive the incoming call from the gateway, the first communication device being coupled to a customer center, wherein the first communication device transmits media streams associated with the incoming call to a second communication device via the gateway, wherein the gateway duplicates the media streams and transmits the duplicated media streams over the network; and
    a recording device operative to record the duplicated media streams.

10. The system as defined in claim 9, further comprising a soft switch operative to instruct the gateway to duplicate and transmit the media streams.

11. The system as defined in claim 10, wherein the recording device is operative to transmit instructions to the soft switch, the soft switch being operative to instruct the gateway to duplicate and transmit the media streams based on the transmitted instructions.

12. The system as defined in claim 11, wherein the recording device monitors the incoming calls and invokes duplicate media streaming from the gateway based on monitored calls.

13. The system as defined in claim 11, wherein the recording device receives an event stream corresponding to the incoming call and determines whether to record the media streams associated with the incoming call based on business rules of the customer center.

14. The system as defined in claim 9, wherein the gateway transmits the duplicated media streams to the recording device by issuing a session initiation protocol (SIP) invite to the recording device.

15. The system as defined in claim 9, further comprising a proxy server that receives the media streams associated with the incoming call and distributes the duplicated media streams to the recording device.

16. The system as defined in claim 9, further comprising:
    means for duplicating the media streams from the second communication device via the first communication device; and
    means for transmitting the duplicated media streams from the first communication device to the recording device using one of a recording device name, an IP address, a SIP address, and a domain name system (DNS) name of the recording device.

17. The system as defined in claim 10, wherein the second communication device is located at a customer center or at a customer premises.

18. A system for recording a communication session, comprising:
    a called phone operative to receive an incoming call, the called phone coupled to a customer center, the called phone being operative to transmit voice communications associated with the incoming call to a calling phone;
    a gateway operative to receive the voice communications associated with the incoming call, the gateway being operative to duplicate and transmit the voice communications over a network;

a soft switch operative to instruct the gateway to duplicate and transmit the voice communications; and a recording device operative to record the duplicated voice communications.

19. The system as defined in claim 18, wherein the recording device is operative to transmit instructions to the soft switch to facilitate recording of the voice communications.

20. The system as defined in claim 19, wherein the recording device monitors the incoming calls and invokes duplicate media streaming from the gateway based on monitored calls.

* * * * *